United States Patent [19]

Weaver et al.

[11] Patent Number: 4,923,081
[45] Date of Patent: May 8, 1990

[54] STORAGE TANKS WITH FABRICATED SUPPORT RIBS

[75] Inventors: A. Michael Weaver; Joseph R. Wiegand; Dewey C. Stickley, all of Bakersfield, Calif.

[73] Assignee: Owens-Corning Fiberglas Corporation, Toledo, Ohio

[21] Appl. No.: 147,387

[22] Filed: Jan. 25, 1988

[51] Int. Cl.⁵ .............................................. B65D 7/46
[52] U.S. Cl. ...................................... 220/72; 220/83; 229/DIG. 1
[58] Field of Search ....................... 220/18, 3, 426, 71, 220/1 B, 5 A, 72, 83, 441, 443, 445; 229/DIG. 1, 1.5 R, 22

[56] References Cited

U.S. PATENT DOCUMENTS

| | | | |
|---|---|---|---|
| 3,661,294 | 5/1972 | Pearson | 220/3 X |
| 4,071,161 | 1/1978 | Gilbu | 220/18 |
| 4,375,860 | 3/1983 | Greaves | 220/18 X |
| 4,562,934 | 1/1986 | Hammond | 220/5 A |
| 4,660,738 | 4/1987 | Ives | 220/5 A |
| 4,676,093 | 6/1987 | Pugnale et al. | 220/426 X |
| 4,778,075 | 10/1988 | Wiegand et al. | 220/83 X |

Primary Examiner—Harvey C. Hornsby
Assistant Examiner—K. O'Leary
Attorney, Agent, or Firm—Patrick P. Pacella; Robert F. Rywalski

[57] ABSTRACT

Improved reinforced plastic tanks and novel mandrel processes for producing them are disclosed. One aspect of the invention is concerned with an external support rib and a method for producing it. According to the invention, the rib is fabricated on a hollow rib form secured to the exterior of a tank with resilient netting and thread. The structure comprises chopped fibers and a resin which does not require a source of external heat to cure. The tank with the rib form secured to it is rotated as the lay-up is applied. Netting and threads are supplied to the rib form and they wrap around the rib lay-up and hold it in place until it cures.

Also disclosed is a method for producing a double wall tank incorporating the novel rib. According to this aspect of the invention, the ribs are cured until they are at least tacky. Then, thin flexible panels are wrapped around the outside of the ribs and held in place by a wrap. The panels have a width which is less than the distance between rib centers so that a portion of the top of each rib is exposed between adjacent panels. Two outer endcap forms are positioned at the ends of the tank and an outer tank wall is fabricated over the panels, the exposed rib tops and the outer endcap forms, to produce the external wall of a double wall tank.

10 Claims, 4 Drawing Sheets

STORAGE TANKS WITH FABRICATED SUPPORT RIBS

TECHNICAL FIELD

This invention relates generally to single wall plastic storage tanks with external support ribs and double wall plastic storage tanks with support ribs between the walls. More specifically, the invention relates to an improved support rib for storage tanks and an improved double wall tank structure.

BACKGROUND ART

Reinforcing ribs for tanks have been made on a commercial scale by winding resin-impregnated glass filaments over hollow rib forms secured to the exterior of a tank wall until an adequate rib thickness has been built up. U.S. Pat. No. 3,818,950 teaches that the filament windings may be applied circumferentially, with no helix angle. U.S. Pat. Nos. 3,661,294 and 3,700,512 teach that the filament windings can be cross wound around a rib form to produce a rib. U.S. Pat. No. 3,412,891 teaches several approaches to the formation of an external rib on a reinforced plastic storage tank. Each patent teaches the use of heat-curable resin to impregnate glass filaments just before they are wrapped around a hollow rib form. After an adequate rib thickness has been built up, the wrapping is stopped and heat is applied to cure the resin.

The use of glass filaments, impregnated with a heat-curable resin, to a rib structure is very time consuming and, hence, expensive. A very large number of wrappings of glass filaments is required to produce a rib with adequate thickness and strength. Once the wrapping process is completed, there is a substantial period of time required to cure the lay-up. In the case of a double wall tank, the fabrication of an outer wall over the ribs must wait until the ribs have cured completely. U.S. Pat. No. 4,676,093 discloses a double wall tank with annular ribs bonded to and connecting the inner and outer walls.

SUMMARY OF THE INVENTION

The invention is directed to improved reinforced plastic tanks and to novel mandrel processes for producing them. One aspect of the invention is concerned with an external support rib and a method for producing it. According to the invention, the rib is fabricated on a hollow rib form secured to the exterior of a tank with resilient netting and thread. The fabrication comprises chopped fibers and a resin which does not require a source of external heat to cure. The tank with the rib form secured to it are rotated as the material is applied. Netting and threads are supplied to the rib form and they wrap around the rib lay-up and hold it in place until it cures.

The invention is also concerned with the production of a double wall tank incorporating the novel rib. According to this aspect of the invention, the ribs are cured until they are at least tacky and panels are laid over the ribs and held in place by a wrap. The panels have a width which is less than the distance between rib centers so that a portion of the top of each rib is exposed between adjacent panels. Two outer endcap shells are positioned at the ends of the tank and an outer tank wall is fabricated over the panels, the exposed rib tops and the outer endcap shells, to produce the external wall of a double wall tank.

BRIEF DESCRIPTION OF THE DRAWINGS

The invention is described in detail below with reference to the accompanying drawings wherein.

DETAILED DESCRIPTION OF THE BEST MODE FOR CARRYING OUT THE INVENTION

Figure 1:
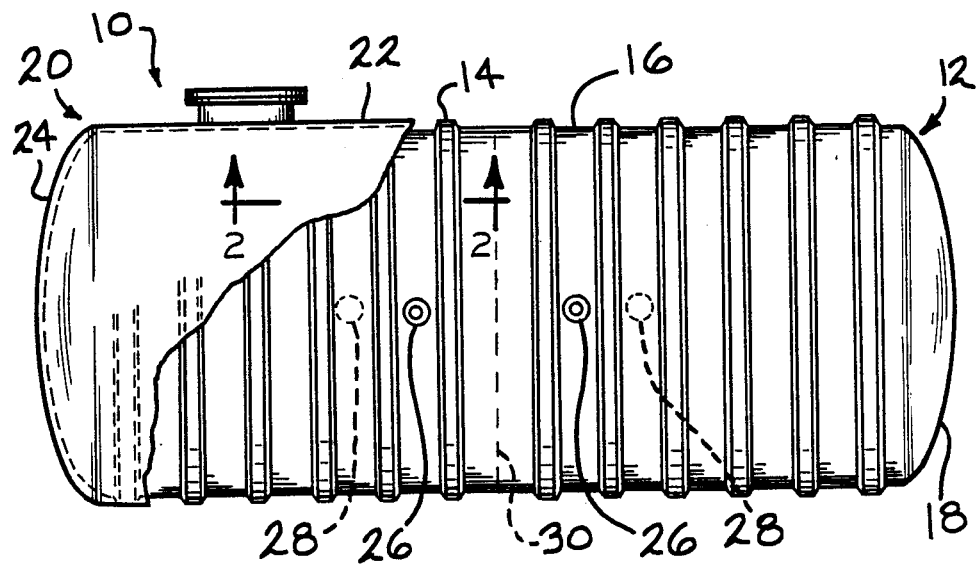
FIG. 1 is an elevational view, partly in section, of a double wall underground tank constructed in accordance with the instant invention.
Figure 2:
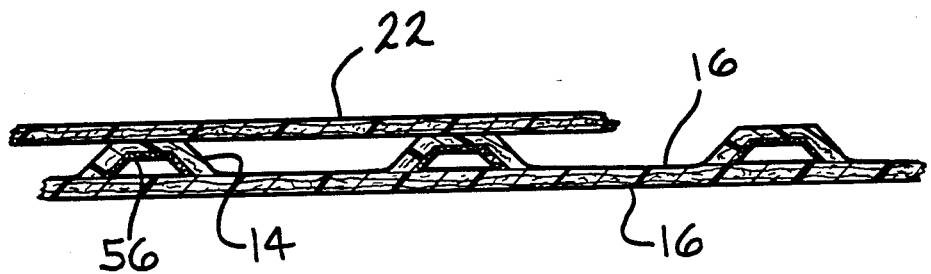
FIG. 2 is an enlarged cross-sectional view taken generally along the line 2—2 of FIG. 1.

With reference to the drawings and in accordance with the invention, FIG. 1 shows a tank 10 formed predominantly of fiber reinforced plastic. Essentially, the tank 10 comprises an inner tank 12 and a plurality of annular, axially spaced reinforcing ribs 14. The inner tank 12 is an integral structure comprising an inner side wall 16 integrally bonded to an inner endcap 18. In a double wall embodiment of the invention, the tank 10 additionally includes an outer wall 20 comprising an outer side wall 22 and an outer endcap 24. A pair of vent fittings 26 are installed between adjacent pairs of ribs 14 to provide communication between the exterior of the tank 10 and the interior of the inner tank 12. Alternate positions for the vent fittings are shown at 28. The tank 10 may be provided with leak detecting means (not illustrated) such as shown in U.S. Pat. No. 4,676,093. In addition, the tank 10 may be provided with the sump and piping system shown in U.S. Pat. No. 4,639,164.

The instant invention is concerned with a novel construction for the ribs 14 and, in the double wall embodiment, a novel construction for the outer side wall 22. The tank 10 is made from two substantially identical cylindrical halves which are separately formed and then integrally joined or welded as at 30. Details regarding the construction of a tank 10 are discussed below with reference to FIGS. 3 through 10.

The inner side wall 16 and the inner endcap 18 are formed first. Preferably, the inner side wall 16 is formed on a rotatable, collapsible mandrel such as disclosed in U.S Pat. No. 4,233,020. The endcap 18 is preferably formed integrally with the inner side wall 16 over an endcap mold supported on the mandrel, in the manner shown in U.S. Pat. No. 4,233,020. It is preferred, however, that the endcap mold be shaped like the endcap mold disclosed in U.S. Pat. No. 4,071,161, i.e., having a spherical central portion which merges into a frustroconical peripheral portion. The procedure for forming a half of an inner tank 12 may be one of several procedures disclosed in various prior art patents including U.S. Pat. Nos. 3,700,512, 3,661,294, 3,412,891 and 3,818,950. Basically, the procedure involves building up a generally cylindrically shaped wall from a combination of chopped glass fibers and a hardenable liquid resin and, if desired, a sand filler. Preferably, the inner side wall is built up on a first layer consisting of a surface mat and a thin layer of hardenable liquid resin and chopped glass fibers. If desired, inner and outer resin-rich layers can be provided in the inner tank 12. Complete wetting of the chopped glass fibers is desirable and can be accomplished, as is well known in the art, by rolling out the resin and glass and sand mixture. After the inner side wall 16 and the inner endcap 18 are fabricated, the resin is cured by the application of heat and/or the passage of time.

Figure 3:
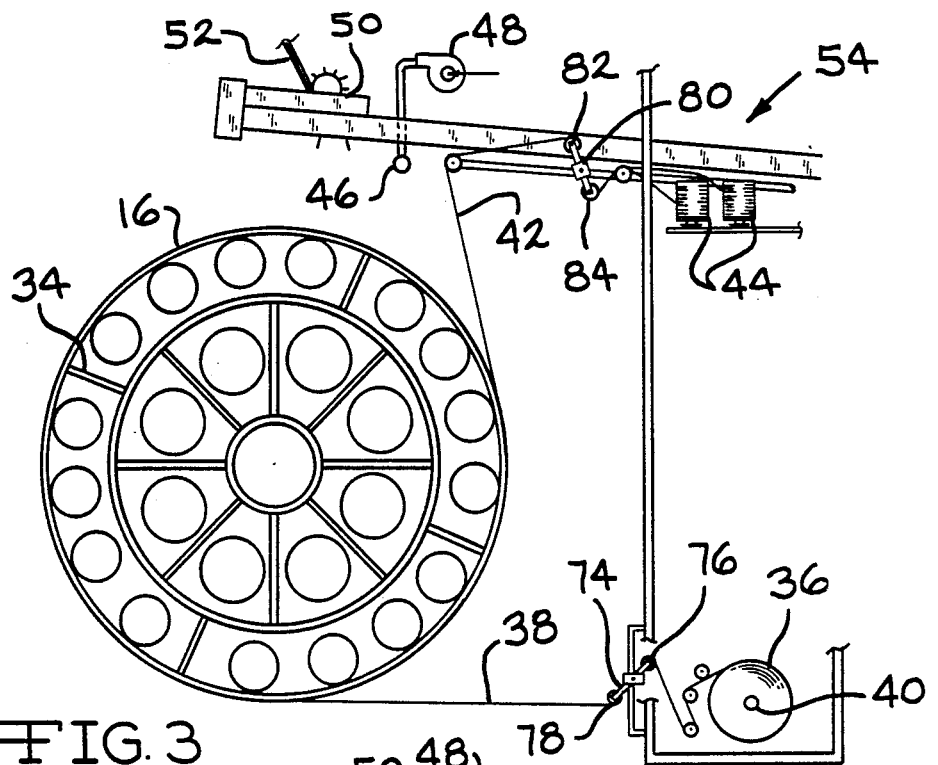
FIG. 3 is an end view of a tank forming mandrel and associated tank forming apparatus after an inner wall has been laid-up on the mandrel.

After the inner side wall 16 and the inner endcap 18 have been fabricated and cured to a gelled state, i.e., the surface is hard and tacky, the axially spaced annular ribs are then applied to the exterior of the inner side wall 16. FIG. 3 illustrates a side wall mandrel 34 with a gel-cured side wall 16 thereon. Positioned adjacent the mandrel 34 is a supply roll 36 of resilient nylon netting 38 mounted for rotation about an axis 40. Polyester thread 42 is supplied from a plurality of spools 44. A pourheader 46 is positioned over the mandrel 34 and is connected to means including a pump 48 for supplying a liquid hardenable resin to the pourheader 46. Adjacent the pourheader 46 and also positioned over the mandrel 34 is a chopper 50 for chopping rovings 52 into chopped fibers.

The roll 36, the spools 44, the pourheader 46 and the chopper 50 are supported on a carriage 54 which, in turn, is supported by means (not shown) for movement along a path parallel to the axis of the mandrel 34. Indexing means (not shown) are provided for controlling the movement and position of the carriage 54 relative to the mandrel 34. The rib forming process begins by positioning the carriage 54 at the first rib position.

A free end of the netting 38 is taped or otherwise secured to the surface of the inner side wall 16. Free ends of the threads 42 are similarly secured to the surface of the inner side wall 16. It is preferred that nine threads 42 be used in the formation of each rib 14. At this point, the mandrel 34 and with it the inner side wall 16 are rotated in a clockwise direction as seen from FIG. 3. The threads 42 and the netting 38 are unwound from the spools 44 and the roll 36 and become wrapped around the surface of the side wall 16.

Upon the completion of one revolution, rotation of the mandrel 34 is continued as a rib form 56 (FIG. 4) is fed between the netting 38 and the side wall 16. Conveniently, a plurality of rib forms 56 are serially fed, end-to-end, between the netting 38 and the side wall 16 until the rib forms 56 extend around the entire circumference of the side wall 16 as shown in FIG. 5. The netting 38 serves to resiliently retain the rib forms 56 against the surface of the side wall 16. The threads 42 also serve to retain the rib forms 56 against the side wall 16 although this is a secondary function of the threads 42.

Figure 6:
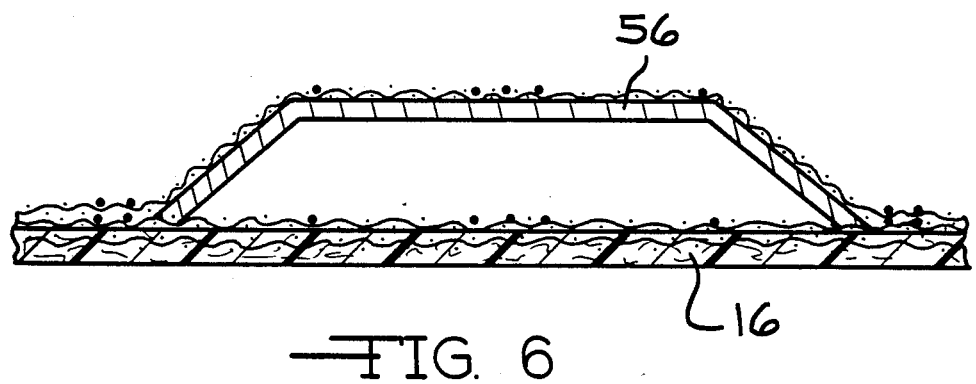
FIG. 6 is an enlarged, fragmentary, cross-sectional view showing a rib form secured to an inner tank side wall.

FIG. 6 shows the rib form 56 at this stage in the rib forming process. A layer of netting 38 overlays the rib form 56 and five threads are wrapped over the rib form 56. A pair of threads are wrapped directly around the inner side wall 16 on each side of the rib form 56. This thread spacing can be maintained with suitable thread guides (not illustrated).

The rib form 56 can be made from cardboard, plastic or another suitable material. If made from cardboard, the rib form 56 can be similar to that shown in U.S. Pat. No. 3,412,891, i.e., having a cross-sectional shape of a top and two sides of a trapezoid wherein the sides form an interior angle with the top of roughly 135 degrees. This patent discloses that the sides of the forms are slotted to permit the form to assume a circular shape. The patent also discloses the use of blocks having correspondingly shaped cross-sections for supporting the form. The rib form 56 illustrated in FIGS. 6 through 10 is a three sided plastic rib form especially suited for use in the production of a double wall tank.

Upon the completion of the second revolution of the mandrel 34, rotation is continued and resin is delivered to and through the pourheader 46 and falls, by gravity, onto the rotating rib form 56 and a portion of the adjacent surface of the sidewall 16. The pourheader 46 is a tube with a plurality of apertures through which the resin is dispensed. As previously mentioned, it is preferred that the resin be one which is self curing and does not require the application of external heat to cure.

Figure 7:
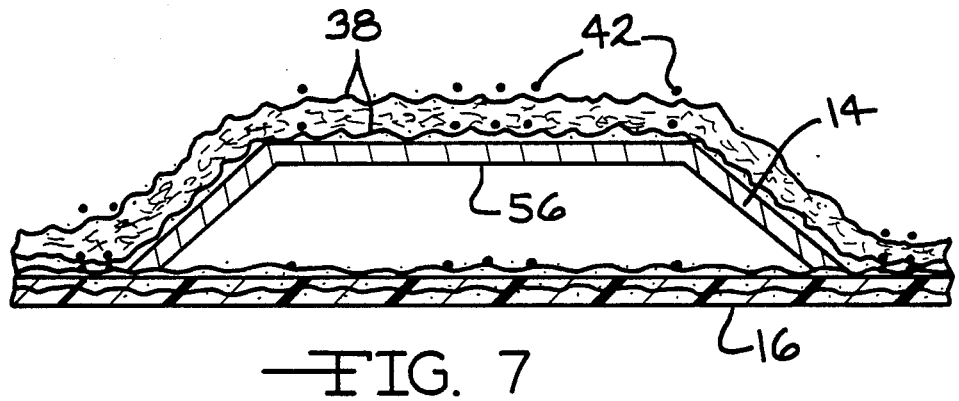
FIG. 7 is a view corresponding with FIG. 6 and showing the lay-up of a rib on the rib form.
Figure 8:
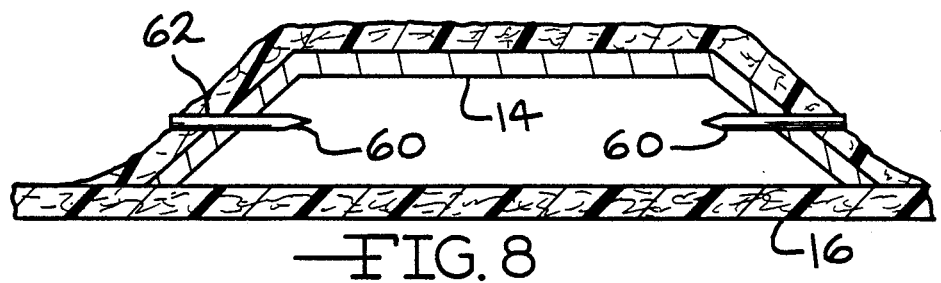
FIG. 8 is a view corresponding with FIGS. 6 and 7 and showing flow tubes inserted through the side walls of the ribs.

Upon the completion of the third revolution, rotation is continued and the chopper 50 is activated to produce chopped fibers 58 which fall, by gravity, onto the surface of the rib form 56 and adjacent portions of the surface of the side wall 16. As the mandrel 34 rotates, just fallen chopped fibers 58 advance to a position below the pourheader 46 and resin is applied to the chopped fibers 58. At this point, gravity and some adhesion provided by the resin retains the resin wetted chopped fibers 58 on the rib form 56. As the mandrel 34 continues to rotate, resin wetted chopped fibers 58 pass under the threads 42 which do two things. The threads 42 promote thorough wetting of the chopped fibers 58 by the resin. In addition, the threads 42 hold the resin wetted chopped fibers on the rib form 56 against the force of gravity when they are on the underside of the mandrel 34. These two functions of the threads 42 are also assisted by the netting 38 which continues to be dispensed during the application of the chopped fibers 58. FIG. 7 illustrates the rib form 56 at this stage in the rib forming process. A layer of chopped fibers 58 and resin is sandwiched between two layers of netting 38 and threads 42 on the exterior of the rib form 56.

Upon the completion of seven or eight revolutions, dispensing the resin and chopped fibers is stopped and rotation is continued for about one and one half revolutions to achieve adequate wetting of the lay-up under the tension of the netting 38 and the threads 42. At this point, rotation of the mandrel is stopped and the netting 38 and the threads 42 are adVanced to the next rib form 56, by advancing the carriage 54. This completes the formation of a rib 14 in the single wall embodiment of the invention. In the double wall embodiment, it is preferred that flow means be associated with each rib 14 to provide communication between the interior and exterior of each rib 14 through the side walls thereof. U.S. Pat. No. 4,676,093 discloses the use of punching tools for forming apertures in the side walls of freshly fabricated ribs before curing. The tools are rods which have a pointed end and a handle end. After the ribs have cured, the tools are removed, leaving permanent apertures in the rib side walls.

In accordance with the instant invention, novel flow means comprising flow inserts 60 (FIG. 8) are preferred. After the fabrication of a rib is completed, a plurality of flow inserts 60 are pushed through the sidewall of the rib. Unlike the tools disclosed in U.S. Pat. No. 4,676,093, the flow inserts 60 are disposable, i.e., the flow inserts 60 are not removed after the rib lay-up has cured. Accordingly, it is preferred that the flow inserts 60 be made of plastic or some other inexpensive material. The flow inserts 60 comprise a hollow tubular portion 62 and a pointed end 64 adapted for piercing the uncured rib lay-up. Four pairs of flow inserts 60 are inserted in each rib. Each pair is inserted through opposed side walls of the rib and the four pairs are angularly spaced at 90 degree intervals around the rib.

After the fabrication of the first rib 14, the carriage 54 is axially indexed to the next rib position and the process described above is repeated. The number of ribs 14 shown in FIGURE one is illustrative only and more or fewer ribs may be used, depending on the desired capacity and size of a given tank. In the double wall embodiment, a sacrificial rib is formed and later removed. The sacrificial rib serves a support function in connection with the formation of the outer side wall 22 to maintain it in substantially parallel relationship to the inner side wall 16.

Figure 9:
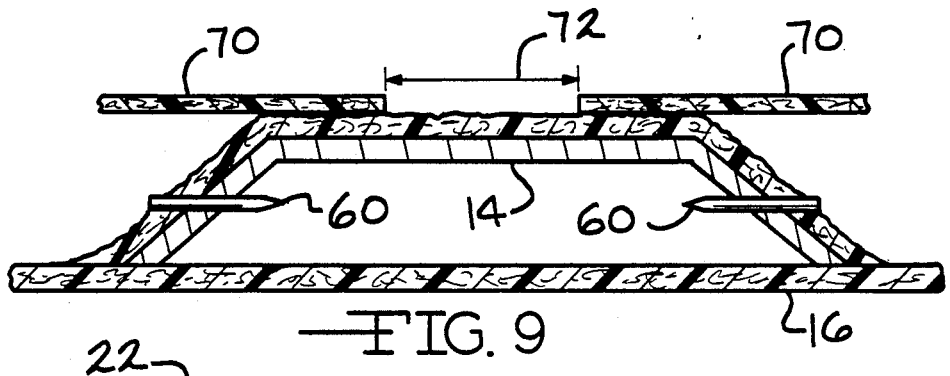
FIG. 9 is a view corresponding with FIGS. 6, 7 and 8 and showing outer wall base panels supported on the rib.

Referring now to FIG. 9, the formation of an outer side-wall will now be described. When the fabricated ribs have all cured to at least a gelled state, i.e., the surface is hard and tacky, base panels 70 are wrapped around the ribs 14 and secured there, for example, with a relatively narrow band of fiberglass netting (not illustrated) wrapped two or three times around the outside of the panels 70. The base panels 70 are thin, flexible, glass fiber reinforced sheets which are somewhat narrower than the distance between the centerlines of the ribs. For example, panels having a thickness of sixty thousandths of an inch and a width of nine inches have been used successfully in a tank having ribs spaced on eleven and one half inch centers. As a consequence of this dimensioning, there is a gap 72 (of two and one half inches axial dimension) between the edges of adjacent panels 70. The panels 70 are self-supporting, i.e., they support their own weight between adjacent ribs 14 without substantial deformation.

This is in contrast to a prior art method of using a flexible porous scrim as a base sheet for the lay-up of an outer wall. U.S. Pat. No. 4,676,093 discloses a double-wall tank wherein an outer wall is laid up on base sheets of scrim which are overlappingly wrapped around ribs. Before the outer wall is laid up, resin is sprayed on the scrim and cured until it stiffens the scrim. This is an expensive and time-consuming process because of the cost of the fiberglass scrim and the time required for the curing of the resin impregnated scrim.

Figure 10:
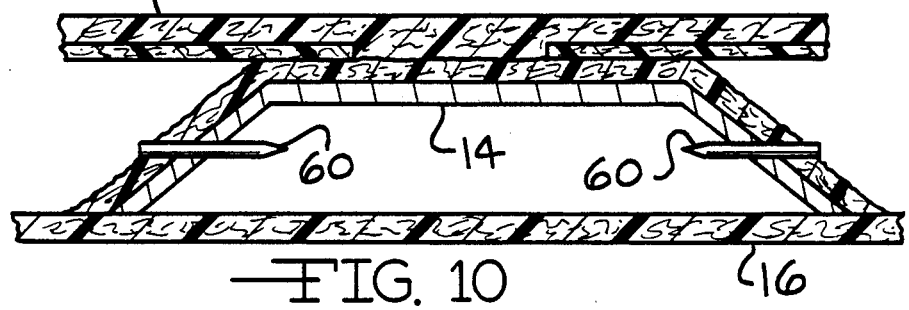
FIG. 10 is a view corresponding with FIGS. 6, 7, 8 and 9 and showing an outer wall laid-up on the base panels.

Before an outer wall 22 is fabricated on the panels 70 and the portion of the rib 56 which is exposed in the gap 72, an outer endcap shell (not illustrated) is positioned at the closed end of the tank half. After the panels 70 and the endcap shell are in place, the fabrication of the outer wall is commenced. Preferably, the formation comprises resin, chopped glass strand and sand which is applied in a conventional manner. As shown in FIG. 10, the formation of the outer wall 22 fills each gap 72 between the panels 70. This permits the outer wall 22 to bond directly to the top of each rib 14 over a substantial area corresponding with the gap 72. As a consequence, the tank 10, as a whole, exhibits remarkable integrity after the structure of the outer wall 22 has cured.

Two double wall tank halves produced in accordance with the process discussed above are united to form a tank 10. A portion of the open end of each tank half, including the sacrificial rib, is removed by sawing through the tank half, perpendicularly to the longitudinal axis of the tank half. One of the tank halves is provided with a manway 74 (FIG. 1) to facilitate the process of joining the two halves. Basically, the two tank halves are joined by a weld consisting of an internal lay-up and an external lay-up, according to the process disclosed and illustrated in U.S. Pat. No. 4,676,093. The product is a tank 10 with inner and outer side walls 16 and 22 which are integrally connected and bonded to the ribs 14. There is a cavity formed between the inner side wall 16 and the inner endcap 18, on the one hand, and the outer side wall 22 and the outer endcap 24, on the other hand. Continuity of the cavity, through the ribs 14, is provided for by the flow inserts 60 which remain in place in the finished tank 10. Thus, the tank is well suited to be equipped with leak detecting apparatus such as that shown in U.S. Pat. No. 4,676,093 and a sump and piping system such as that shown in U.S Pat. No. 4,639,164.

Figure 4:
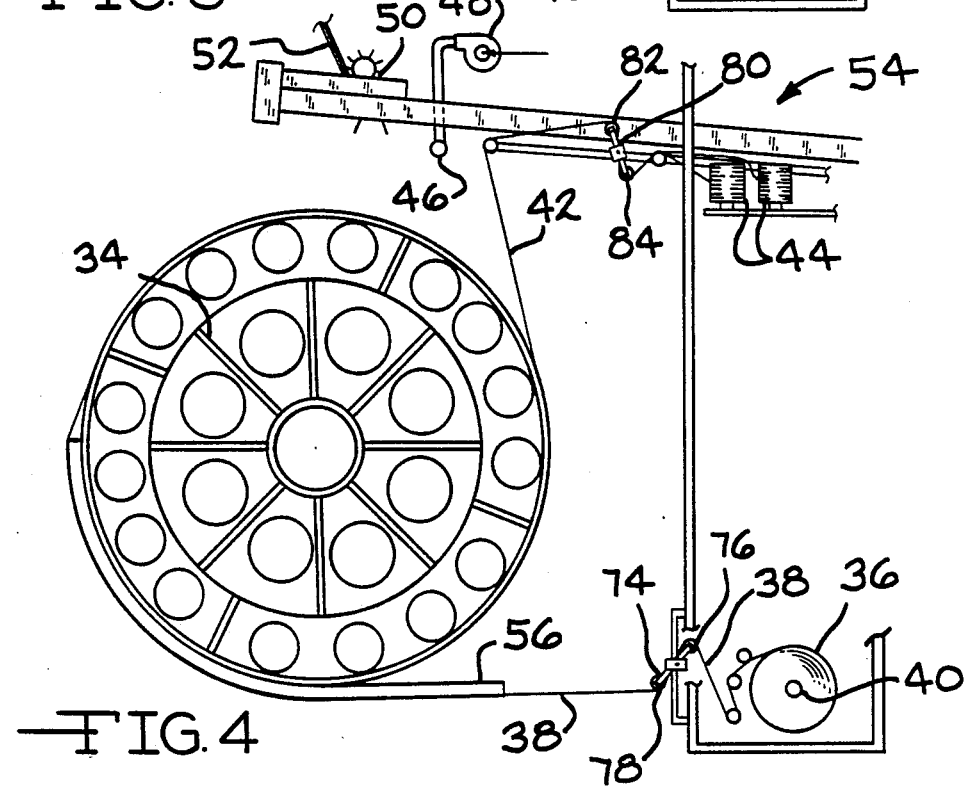
FIG. 4 is a view corresponding with that of FIG. 3, but during the application of a rib form to the exterior of the inner wall.
Figure 5:
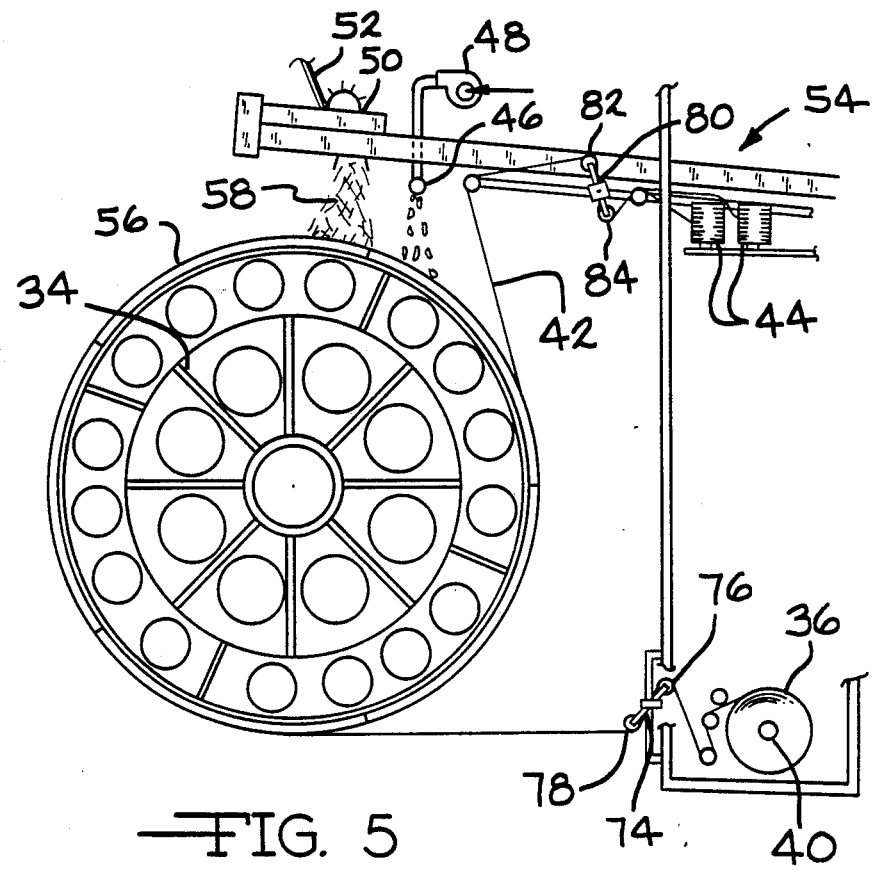
FIG. 5 is a view corresponding with FIGS. 3 and 4, but during the lay-up of a rib on the rib form.

The tank forming apparatus illustrated in FIGS. 3 through 5 includes means for maintaining the tension under which the netting 38 is supplied at a constant. The means include a tensioning bar 74 which is pivotally supported on the carriage 54. Netting 38 from the supply roll 36 passes around upper and lower rollers 76 and 78 carried by the tensioning bar 74. Preferably, the tension imparted to the netting 38 by the tensioning bar 74 is electronically controlled for consistency and continuity. A suitable control (not illustrated) is available from Cleveland Kidder/Cleveland Machine Controls, Inc. under the designation UCP9/TA-10/TLD-IL/AIR. This control can be set up in conjunction with the same company's Model TIX-1/TA10 amplifier and M846-02160 Type S tension transducers (not illustrated) to maintain a proper tension in the netting 38 as it is fed to the mandrel. Proper tension in this case is the tension or range of tensions between (a) the lowest tension at which the netting 38 would break or at which the rib forms 56 would be flattened, whichever is less, and (b) the highest tension at which there is inadequate wetting of the chopped strands or at which the netting does not hold the rib form 56 in place during the fabrication of the ribs 14, whichever is greater. Other suitable means for maintaining proper netting tension may be used. Similar tension control means (not illustrated) are associated with a second tensioning bar 80 which is also pivotally supported on the carriage 54. Rotatably mounted on the bar 80 are upper and lower rollers 82 and 84. The bar 80 and associated controls govern the tension of the threads 42 to maintain it well below the lowest tension at which the threads 42 would break and high enough so that the threads contribute to the wetting of the chopped strands as they are laid-up on the rib forms 56.

We claim:
1. A plastic, fiber reinforced storage tank comprising a cylindrically shaped side-wall,
a pair of opposed end caps integrally connected to said side-wall and, together therewith, constituting an inner tank, and annular reinforcing ribs integrally connected to and supported on the exterior of said side-wall, said ribs comprising hollow rib forms and an overlayed structure of chopped fibers and liquid, hardenable resin, said chopped fibers being wetted by and dispersed within said hardenable resin, and including netting and threads in contract with said structure, said threads serving to hold said resin-wetted chopped fiber structure on said rib form against the force of gravity and said netting exerting a compressive action on said threads and overlayed structure so as to promote wetting of the chopped fibers and retain said rib forms on said side-wall.

2. The tank claimed in claim 1 wherein said resin is hardened and further including an outer tank comprising a cylindrically shaped side-wall connected and bonded to the exterior of said ribs and further including flow means for providing communication between the hollow spaces in each rib and the spaces between the ribs and between the inner and outer cylindrical walls, said flow means comprising hollow tubular inserts passing through said hardened resin and having an open end thereof terminating within said hollow rib form.

3. The storage tank of claim 1 wherein said thread is a polyester thread.

4. The storage tank of claim 3 wherein said netting is a polyamide.

5. In a plastic fiber reinforced storage tank having a cylindrically shaped side-wall and opposed end caps integrally connected to said wall and at least three axially displaced, outwardly extending annular ribs, the improvement wherein said ribs comprise outwardly extending rib forms connected to said side-wall, and wherein said ribs further comprise a mixture of hardenable resin and resin-wetted chopped fibers covering said rib forms, said chopped fibers being dispersed within said resin, netting in contact with said mixture and retaining said rib forms against said side-wall, and threads in contact with said mixture, said threads serving, during manufacture, to hold said mixture on the rib form, said netting also promoting the wetting of said chopped fibers and resin.

6. The tank of claim 5 wherein said thread is a polyester thread.

7. The tank of claim 6 wherein said netting is polyamide.

8. In a plastic fiber reinforced storage tank having a cylindrically shaped side-wall and opposed end caps integrally connected to said wall and at least three axially displaced, outwardly extending annular ribs, the improvement wherein said ribs comprise outwardly extending rib forms connected to said side-wall, and wherein said ribs further comprise a mixture of resin and chopped fibers covering said rib forms, netting in contact with said mixture and retaining said rib forms against said side-wall, and threads in contact with said mixture, said threads serving, during manufacture, to promote the wetting of said chopped fibers and resin, and to hold said mixture on the rib form and wherein said tank further includes self-supporting panels respectively axially disposed between different adjacent two of said three ribs and having axial lengths less than the distance between the centerlines of said ribs to thereby provide a gap disposed between said panels, radially outwardly of said ribs.

9. The tank of claim 8 wherein said mixture is cured and further including a second cylindrically shaped sidewall disposed outwardly of said other sidewall, said second sidewall including an integral, radially inwardly extending portion disposed in said gap and in direct bonding contact with said resin and chopped glass mixture of said ribs.

10. The tank of claim 4 wherein said sidewall includes another portion directly fabricated on said self-supporting panels.

* * * * *